(12) United States Patent
Shonai et al.

US011668397B2

(10) Patent No.: US 11,668,397 B2
(45) Date of Patent: Jun. 6, 2023

(54) SEALING STRUCTURE FOR COVER MADE OF RESIN

(71) Applicant: NOK CORPORATION, Tokyo (JP)

(72) Inventors: Shiho Shonai, Fukushima (JP); Hiromi Sugihara, Fukushima (JP); Kokichi Hamamoto, Fukushima (JP); Tomoaki Nishimura, Fukushima (JP)

(73) Assignee: NOK CORPORATION

( * ) Notice: Subject to any disclaimer, the term of this patent is extended or adjusted under 35 U.S.C. 154(b) by 37 days.

(21) Appl. No.: 17/059,167

(22) PCT Filed: Aug. 9, 2019

(86) PCT No.: PCT/JP2019/031669
§ 371 (c)(1),
(2) Date: Nov. 25, 2020

(87) PCT Pub. No.: WO2020/045062
PCT Pub. Date: Mar. 5, 2020

(65) Prior Publication Data
US 2021/0215251 A1 Jul. 15, 2021

(30) Foreign Application Priority Data
Aug. 28, 2018 (JP) .............................. JP2018-159351

(51) Int. Cl.
*F16J 15/3204* (2016.01)
*F16J 15/447* (2006.01)

(52) U.S. Cl.
CPC ......... *F16J 15/3204* (2013.01); *F16J 15/447* (2013.01)

(58) Field of Classification Search
CPC .......... F16J 15/00; F16J 15/32; F16J 15/3204; F16J 15/3208; F16J 15/3216;
(Continued)

(56) References Cited

U.S. PATENT DOCUMENTS 5,329,898 A 7/1994 Nelson et al.
7,665,740 B2 * 2/2010 Munekata ............... F16F 9/362
277/436

(Continued)

FOREIGN PATENT DOCUMENTS

CN 107110284 A 8/2017
EP 3222893 A1 9/2017
(Continued)

OTHER PUBLICATIONS

Notice of Reasons for Refusal dated Sep. 21, 2021 in the corresponding JP application No. 2020/539313 including English translation (15 pages).

(Continued)

*Primary Examiner* — Nathan Cumar
(74) *Attorney, Agent, or Firm* — Harness, Dickey & Pierce, P.L.C.

(57) ABSTRACT

A sealing structure for a front cover of an engine includes a front cover made of resin of an engine in which a through-hole, into which a boss part of a torsional damper is to be inserted, is provided, and a sealing apparatus to seal between the through-hole of the front cover and the shaft part. The sealing apparatus includes a support ring that is made of resin and has an annular shape, and an elastic body part that is made of an elastic material, has an annular shape and is attached to the support ring. The elastic body part has an annular seal lip that contacts the shaft part such that the shaft part is able to slide, and the support ring is bonded to the front cover.

8 Claims, 7 Drawing Sheets

(58) Field of Classification Search
CPC ...... F16J 15/322; F16J 15/447; F16J 15/4472; F16J 15/4474; F16J 15/4476; F16J 15/4478
USPC ....................................................... 277/560
See application file for complete search history.

(56) References Cited

U.S. PATENT DOCUMENTS

| | | | | |
|---|---|---|---|---|
| 8,282,107 | B2* | 10/2012 | Horiba | F16J 15/322 277/551 |
| 8,784,724 | B2* | 7/2014 | Watanabe | B29C 45/34 264/500 |
| 9,297,457 | B2* | 3/2016 | Arita | F16J 15/3216 |
| 2008/0309016 | A1* | 12/2008 | Ozawa | F16J 15/322 277/345 |
| 2017/0268676 | A1* | 9/2017 | Kamiya | F16J 15/447 |
| 2017/0284547 | A1 | 10/2017 | Komyo et al. | |
| 2019/0113080 | A1 | 4/2019 | Kamiya et al. | |

FOREIGN PATENT DOCUMENTS

| | | | |
|---|---|---|---|
| JP | H5-177711 | A | 7/1993 |
| JP | H5-071542 | U1 | 9/1993 |
| JP | H6-285994 | A | 10/1994 |
| JP | H07-055015 | A | 3/1995 |
| JP | H11-216776 | A | 8/1999 |
| JP | 2006-242000 | A | 9/2006 |
| JP | 2009103142 | A | 5/2009 |
| JP | 2009-209688 | A | 9/2009 |
| JP | 2011-241891 | A | 12/2011 |
| JP | 2011241891 | A * | 12/2011 |
| JP | 2016-121763 | A | 7/2016 |
| JP | 2016-156418 | A | 9/2016 |
| WO | 2008-093468 | A1 | 8/2008 |
| WO | WO-2016111129 | A1 * | 7/2016 ............ F16F 15/126 |
| WO | 2017-051920 | A1 | 3/2017 |
| WO | 2017-199963 | A1 | 11/2017 |

OTHER PUBLICATIONS

First Office Action for corresponding Chinese Application No. 201980035379.0 dated Mar. 31, 2022 with English translation (15 Pages).

Extended European Search Report for corresponding Application No. 19856169.8 dated Apr. 7, 2022 (7 Pages).

International Search Report (English and Japanese) and Written Opinion (Japanese) of the International Searching Authority issued in PCT/JP2019/031669, dated Oct. 8, 2019; ISA/JP.

International Search Report (English and Japanese) and Written Opinion (Japanese, with English translation) of the International Searching Authority issued in PCT/JP2019/026214, dated Sep. 10, 2019; ISA/JP with International Preliminary Report on Patentability Chapter 1.

* cited by examiner

SEALING STRUCTURE FOR COVER MADE OF RESIN

CROSS REFERENCE TO RELATED APPLICATIONS

This is the National Stage of International Application No. PCT/JP2019/031669, filed Aug. 9, 2019, which claims the benefit of Japanese Patent Application No. 2018-159351 filed Aug. 28, 2018. The entire contents of the above applications are incorporated herein by reference in their entirety.

BACKGROUND

Technical Field

The present disclosure relates to a sealing structure for a cover made of resin, and particularly relates to a sealing structure with a sealing apparatus between a front cover made of resin of an engine or the like and a movable member.

Related Art

In an engine of a vehicle, for example, a through-hole is formed in a front cover of the engine that covers an accessory attached to a side surface of a crankcase or a timing chain, an end portion of a crankshaft protrudes to the outside through the through-hole, and a torsional damper is attached to the end portion. With regard to the through-hole of the front cover, an annular space is formed between the through-hole and the end portion of the crankshaft or a boss part of the torsional damper, and an oil seal serving as a sealing apparatus is used to seal the space. The oil seal is press-fitted into the through-hole of the front cover and fastened to the front cover by a rubber material on an outer periphery side thereof which is compressed (For example, see Japanese Patent Application Publication No. 7-55015).

In recent years, for the reason of improving the fuel consumption of the vehicle and the like, attempts to reduce the weight of the vehicle are being made, attempts to reduce the weight of the engine are also being made, and weight reduction of the front cover of the engine is also demanded. Although the conventional front cover of an engine is made of metal, such as an aluminum alloy, it is being contemplated to use resin to make the front cover of an engine in order to reduce the weight.

A molded piece made of resin has a large dimensional tolerance, and the resin has a high coefficient of thermal expansion and a large creep deformation. Therefore, if a front cover made of resin is used for an engine, there is a concern that a gap would be formed between the oil seal press-fitted into the through-hole and the front cover. In particular, because of the difference in coefficient of thermal expansion between the rubber material forming the oil seal and the resin material forming the front cover, a gap may be formed between the inner circumferential surface of the through-hole of the front cover and the outer circumferential surface of the oil seal when the front cover is thermally expanded.

For this reason, the sealing structure for a cover made of resin, such as a front cover made of resin for an engine, needs to be a structure that can maintain the sealing performance regardless of the usage state thereof, such as the ambient temperature.

The present disclosure has been made in view of the problems described above, and it is an object of the present disclosure to provide a sealing structure for a cover made of resin that can maintain the sealing performance regardless of the usage state thereof.

SUMMARY

To attain the object described above, a sealing structure for a cover made of resin according to the present disclosure is characterized by including a cover made of resin in which a through-hole, into which a shaft part is to be inserted, is provided, and a sealing apparatus to seal between the through-hole of the cover made of resin and the shaft part, in which the sealing apparatus includes a support ring that is made of resin and has an annular shape about an axis, and an elastic body part that is made of an elastic material, has an annular shape about the axis and is attached to the support ring, the elastic body part has an annular seal lip that contacts the shaft part such that the shaft part is able to slide, and the support ring is bonded to the cover made of resin.

In the sealing structure for a cover made of resin according to an aspect of the present disclosure, the support ring is bonded by welding to the cover made of resin.

In the sealing structure for a cover made of resin according to an aspect of the present disclosure, a bonding part of the support ring, which is a part to be bonded to the cover made of resin, has an annular shape about the axis, the bonding part has an annular projection part that protrudes in the direction of the axis, and the support ring is bonded to the cover made of resin at the projection part made molten.

In the sealing structure for a cover made of resin according to an aspect of the present disclosure, the support ring is provided with an annular recessed part that is recessed in the direction of the axis on at least any of an inner periphery side and an outer periphery side of the projection part.

In the sealing structure for a cover made of resin according to an aspect of the present disclosure, the support ring is bonded with adhesive to the cover made of resin.

In the sealing structure for a cover made of resin according to an aspect of the present disclosure, the shaft part is a boss part of a torsional damper, the elastic body part has an annular dust lip, and the support ring forms a labyrinth seal in cooperation with the torsional damper.

In the sealing structure for a cover made of resin according to an aspect of the present disclosure, the support ring has at least one support ring protrusion part, which is an annular part that protrudes in the direction of the axis, the torsional damper has at least one torsional damper protrusion part, which is an annular part that protrudes in the direction of the axis, and the support ring protrusion part and the torsional damper protrusion part are opposed to each other to form an annular gap, thereby forming the labyrinth seal.

In the sealing structure for a cover made of resin according to an aspect of the present disclosure, the shaft part is a boss part of a torsional damper, the elastic body part has an annular dust lip, and the cover made of resin forms a labyrinth seal in cooperation with the torsional damper.

In the sealing structure for a cover made of resin according to an aspect of the present disclosure, the cover made of resin has at least one cover protrusion part, which is an annular part that protrudes in the direction of the axis, the torsional damper has at least one torsional damper protrusion part, which is an annular part that protrudes in the direction of the axis, and the cover protrusion part and the torsional damper protrusion part are opposed to each other to form an annular gap, thereby forming the labyrinth seal.

Effects of Disclosure

The sealing structure for a cover made of resin according to the present disclosure can maintain the sealing performance regardless of the usage state thereof.

DETAILED DESCRIPTION

Hereinafter, an embodiment of the present disclosure will be described with reference to the drawings.

Figure 1:
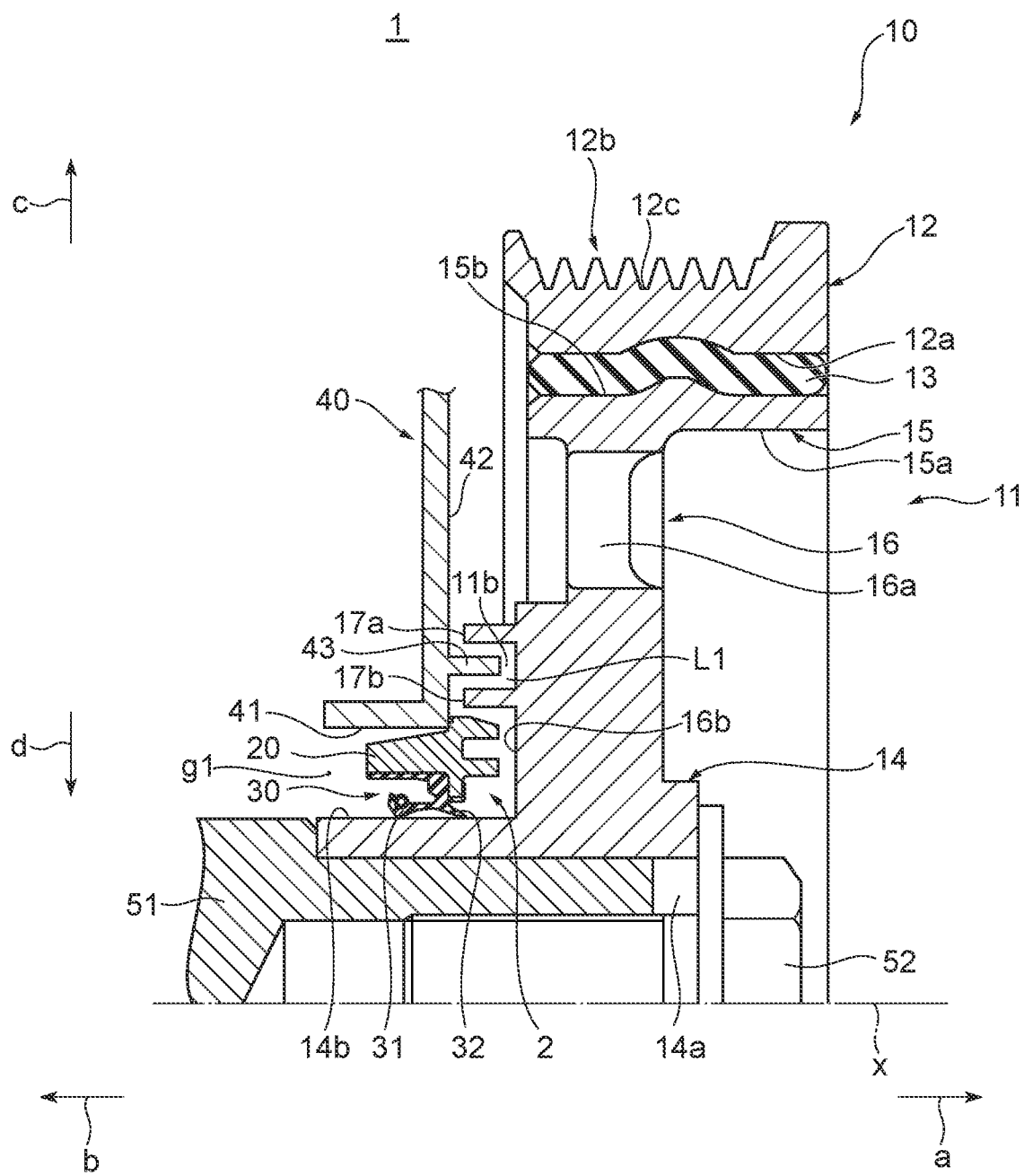
FIG. 1 is a partial cross-sectional view taken along an axis, showing a schematic configuration of a sealing structure for a front cover of an engine as a cover made of resin according to an embodiment of the present disclosure.
Figure 2:
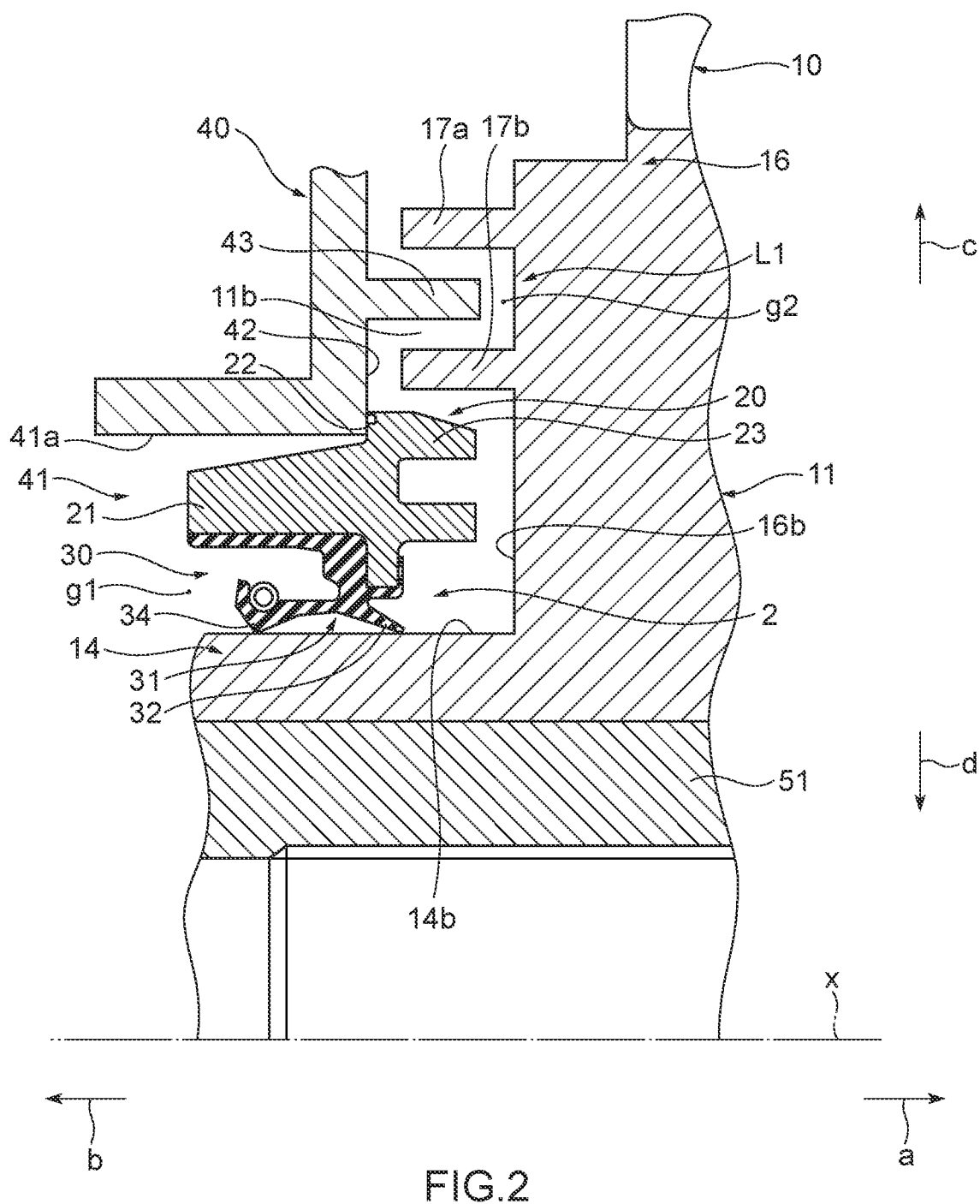
FIG. 2 is a partial enlarged cross-sectional view of the sealing structure shown in FIG. 1.

FIG. 1 is a partial cross-sectional view taken along an axis, showing a schematic configuration of a sealing structure for a front cover of an engine (referred to simply as a "sealing structure" hereinafter), which is a cover made of resin according to an embodiment of the present disclosure, and FIG. 2 is a partial enlarged cross-sectional view of the sealing structure shown in FIG. 1. Hereinafter, for convenience of explanation, an arrow a (see FIG. 1) direction in a direction of an axis x will be referred to as an outer side, and an arrow b (see FIG. 1) direction in the direction of the axis x will be referred to as an inner side. More specifically, the outer side is the direction away from the inside of a front cover, and the inner side is the direction toward the inside of the front cover. In a direction perpendicular to the axis x (which will also be referred to as "a radial direction"), the direction away from the axis x (indicated by an arrow c in FIG. 1) will be referred to as an outer periphery side, and the direction toward the axis x (indicated by an arrow d in FIG. 1) will be referred to as an inner periphery side.

As shown in FIGS. 1 and 2, a sealing structure 1 for a front cover of an engine includes a front cover 40 made of resin of an engine with a through-hole 41 in which a shaft part (a boss part 14 of a torsional damper 10 described later) is to be inserted, and a sealing apparatus 2 to seal between the through-hole 41 of the front cover 40 and the shaft part. The sealing apparatus 2 includes a support ring 20 that is made of resin and annular about the axis x and an elastic body part 30 that is made of an elastic material, annular about the axis x and attached to the support ring 20. The elastic body part 30 has an annular seal lip 31 that contacts the shaft part such that the shaft part is able to slide, and the support ring 20 is bonded to the front cover 40. Hereinafter, the sealing structure 1 for a front cover of an engine according to the embodiment of the present disclosure will be specifically described.

The sealing structure 1 for a front cover of an engine according to the embodiment of the present disclosure is applied to a front cover made of resin of an engine used for a vehicle, a general-purpose machine or the like, a torsional damper, and a sealing apparatus that seals an annular space between a boss part of the torsional damper serving as a shaft part and a through-hole of the front cover.

A damper pulley 10 as the torsional damper 10 is fixed to one end of a crankshaft 51 of the engine by a bolt 52. The damper pulley 10 includes a hub 11, a pulley 12 as a mass body, and a damper elastic body 13 disposed between the hub 11 and the pulley 12. The hub 11 is an annular member centered about the axis x and includes a boss part 14 as a shaft part on the inner periphery side, a rim part 15 on the outer periphery side, and a disk part 16 having a substantially circular disk-like shape that connects the boss part 14 and the rim part 15 to each other. The hub 11 is molded or otherwise formed from a metal material, for example.

In the hub 11, the boss part 14 is an annular part that has a through-hole 14a and is centered about the axis x, and the disk part 16 extends in the outer periphery direction from an outer circumferential surface of an outer side part of the boss part 14. The boss part 14 has an outer circumferential surface 14b, which is a cylindrical outer periphery side surface of an inner side part of the boss part 14, and the outer circumferential surface 14b is a smooth surface and serves as a sealing surface for the sealing apparatus 2 as described later. The rim part 15 is an annular, or more specifically, cylindrical part centered about the axis x, and the rim part 15 is a part located further on the outer periphery side than the boss part 14, concentrically with the boss part 14. The disk part 16 extends in the inner periphery direction from an inner circumferential surface 15a, which is a surface of the rim part 15 on the inner periphery side. The damper elastic body 13 is in pressure-contact with an outer circumferential surface 15b, which is a surface of the rim part 15 on the outer periphery side.

The disk part 16 extends between the boss part 14 and the rim part 15 and connects the boss part 14 and the rim part 15 to each other. The disk part 16 may extend in a direction perpendicular to the axis x or in a direction oblique to the axis x. The cross section of the disk part 16 taken along the axis x (also referred to simply as a "cross section") may be curved or straight. As shown in FIGS. 1 and 2, the disk part 16 has at least one window 16a, which is a through-hole penetrating the disk part 16 between the inner side and the outer side. According to the present embodiment, four windows 16a are formed concentrically about the axis x and at regular angular intervals in the circumferential direction.

The windows 16a are intended to reduce the weight of the hub 11 and thus the damper pulley 10. The damper pulley 10 may have no window 16a.

The pulley 12 is an annular member centered about the axis x and is shaped to cover the hub 11 on the outer periphery side. More specifically, an inner circumferential surface 12a, which is a surface of the pulley 12 on the inner periphery side, has a shape that conforms with the shape of the outer circumferential surface 15b of the rim part 15 of the hub 11, and as shown in FIG. 1, the pulley 12 is positioned in such a manner that the inner circumferential surface 12a is radially opposed at a distance to the outer circumferential surface 15b of the rim part 15. In the outer circumferential surface 12b, which is a surface of the pulley 12 on the outer periphery side, a plurality of annular V-shaped grooves 12c are formed so that a timing belt (not shown) can be wound around the pulley 12.

The damper elastic body 13 is disposed between the pulley 12 and the rim part 15 of the hub 11. The damper elastic body 13 is a damper rubber member and is molded by cross-linking of a rubber-like elastic material having high heat resistance, high cold resistance and high fatigue strength. The damper elastic body 13 is press-fitted between the pulley 12 and the rim part 15 of the hub 11, and fitted and fastened between the inner circumferential surface 12a of the pulley 12 and the outer circumferential surface 15b of the rim part 15.

In the damper pulley 10, the pulley 12 and the damper elastic body 13 form a damper section, and the natural frequency in the torsional direction of the damper section is tuned to corresponds to the natural frequency in the torsional direction of the crankshaft 51, which lies within a predetermined frequency range in which the torsional angle of the crankshaft 51 is at the maximum. That is, the inertial mass of the pulley 12 in the circumferential direction and the shear spring constant of the damper elastic body 13 in the torsional direction are adjusted so that the natural frequency in the torsional direction of the damper section corresponds to the natural frequency in the torsional direction of the crankshaft 51.

The damper pulley 10 further has at least one torsional damper protrusion part, which is an annular part that protrudes in the direction of the axis x and forms a labyrinth seal L1 described later in cooperation with the front cover 40. In the present embodiment, the damper pulley 10 has two torsional damper protrusion parts (an outer periphery side protrusion part 17a and an inner periphery side protrusion part 17b). The outer periphery side protrusion part 17a and the inner periphery side protrusion part 17b are annular parts centered or substantially centered about the axis x that are provided on an inner side surface 16b, which is a disk-like surface facing the inner side that is located further toward the inner periphery side than the windows 16a of the disk part 16 of the hub 11, and protrude inwardly from the inner side surface 16b in the direction of the axis x. The outer periphery side protrusion part 17a is provided further on the outer periphery side than the inner periphery side protrusion part 17b, and a hub groove 11b, which is an annular groove that is centered or substantially centered on the axis x and radially arranged at regular or substantially regular intervals, is formed between outer periphery side protrusion part 17a and the inner periphery side protrusion part 17b.

As described above, the damper pulley 10 is attached to one end of the crankshaft 51 of the engine. More specifically, as shown in FIG. 1, the damper pulley 10 is fixed to the crankshaft 51 by inserting one end of the crankshaft 51 into the through-hole 14a of the boss part 14 of the hub 11 and screwing the bolt 52 into the crankshaft 51 from the outer side.

When attached to the crankshaft 51, the damper pulley 10 is in a state in which the inner part of the boss part 14 having the outer circumferential surface 14b is inserted in the through-hole 41 of the front cover 40, and there is an annular space (gap g1) between the outer circumferential surface 14b of the boss part 14 and the through-hole 41 of the front cover 40.

Figure 3:
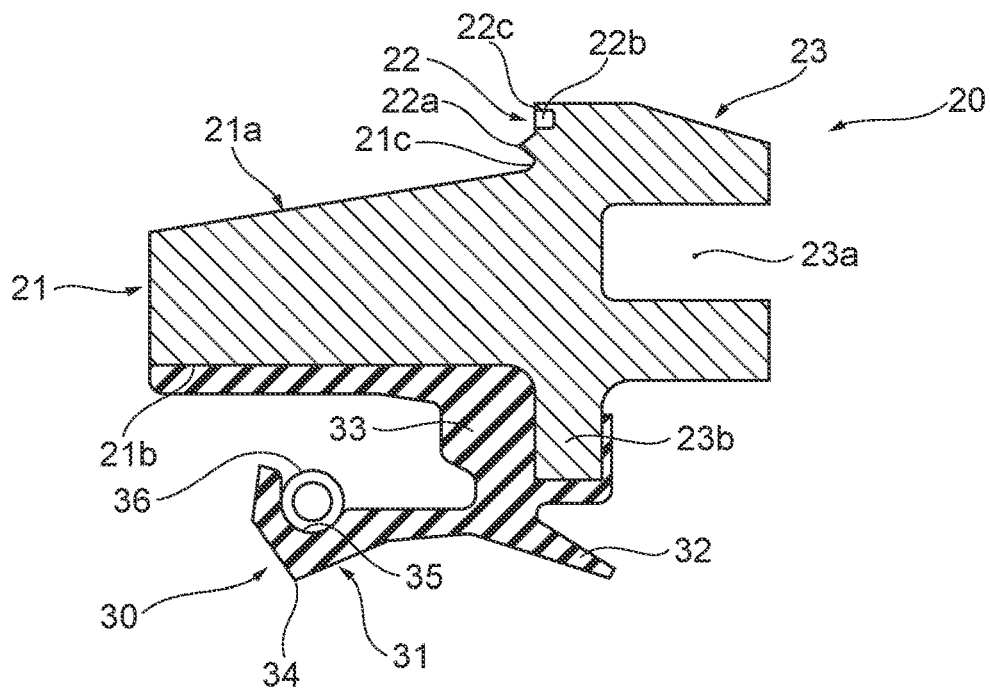
FIG. 3 is a cross-sectional view of a sealing apparatus shown in FIG. 1 taken along the axis, schematically showing a configuration of the sealing apparatus alone before the sealing apparatus is welded to the front cover.

As described above, the sealing apparatus 2 has the support ring 20 made of resin and the elastic body part 30 made of an elastic material attached to the support ring 20. As shown in FIGS. 1 and 2, in the sealing structure 1, the sealing apparatus 2 is bonded by welding to the front cover 40 at the support ring 20. FIG. 3 is a cross-sectional view of the sealing apparatus 2 taken along the axis x, schematically showing a configuration of the sealing apparatus 2 alone before the sealing apparatus 2 is welded to the front cover 40.

As shown in FIGS. 1 to 3, the support ring 20 is an annular member made of resin centered or substantially centered about the axis x, and has an insert part 21, which is an annular part that is to be inserted into the through-hole 41 of the front cover 40, a bonding part 22, which is an annular part to be bonded by welding to the front cover 40, and an outer side part 23, which is an annular part that protrudes to the outer side from the through-hole 41 of the front cover 40. The support ring 20 is integrally made of a resin material, and the insert part 21, the bonding part 22 and the outer side part 23 are integrally-formed parts of the support ring 20.

As shown in FIG. 3, the insert part 21 extends along the axis x and has an outer circumferential surface 21a facing to the outer periphery side and an inner circumferential surface 21b facing to the inner periphery side. As shown in FIGS. 1 and 2, in the sealing structure 1, the insert part 21 is in the through-hole 41 of the front cover 40, and the outer circumferential surface 21a is shaped to guide the insert part 21 into the through-hole 41 when the support ring 20 is attached to the front cover 40, for example. More specifically, as shown in FIG. 3, the outer circumferential surface 21a of the insert part 21 is a tapered surface having a diameter that decreases as progress from the outer side (the side toward the arrow a direction) toward the inner side (the side toward the arrow b direction) in the direction of the axis x. In addition, the diameter of an end portion (end portion 21c) on the outer side of the outer circumferential surface 21a is equal or substantially equal to the diameter of an inner circumferential surface 41a of the through-hole 41 of the front cover 40. This facilitates alignment between the through-hole 41 of the front cover 40 and the sealing apparatus 2.

Figure 4:
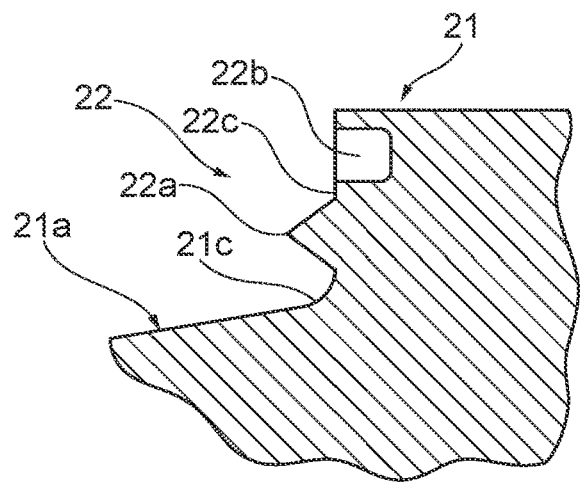
FIG. 4 is a partial enlarged cross-sectional view showing an enlarged view of a bonding part and the surroundings of a support ring shown in FIG. 3.

As shown in FIGS. 3 and 4, the bonding part 22 has an annular projection part 22a that protrudes in the direction of the axis x. As shown in FIGS. 1 and 2, in the sealing structure 1, the support ring 20 is bonded to the front cover 40 at the projection part 22a made molten, and the projection part 22a of the bonding part 22 is a part to be welded. The bonding part 22 is further provided with an annular recessed part 22b recessed in the direction of the axis x that is formed at least any of the inner periphery side or outer periphery side of the projection part 22a. In the present embodiment, one recessed part 22b is provided on the outer periphery side of the projection part 22a. The recessed part 22b provides a space into which the molten projection part 22a flows during welding of the support ring 20. FIG. 4 is a partial enlarged cross-sectional view showing an enlarged view of the bonding part 22 of the support ring 20 and its surroundings.

More specifically, as shown in FIGS. 3 and 4, the bonding part 22 has a bonding surface 22c, which is a surface that is annular about the axis x and faces to the inner side in the direction of the axis x, the projection part 22a protrudes toward the inner side from the bonding surface 22c, and the recessed part 22b is recessed toward the outer side from the bonding surface 22c. The bonding surface 22c is a planar surface that is perpendicular or substantially perpendicular to the axis x, for example. The bonding part 22 may have a plurality of projection parts 22a arranged in the radial direction.

As shown in FIG. 3, the outer side part 23 of the support ring 20 is a part that is located connected to the insert part 21 on the outer side of the insert part 21, in which the bonding part 22 is formed. That is, the outer side part 23 protrudes toward the outer periphery side beyond the insert part 21. In the outer side part 23, a welding jig guide part 23a, which is an annular recessed part that is recessed from the outer side toward the inner side, is further formed. The welding jig guide part 23a is a part in which a welding jig is fitted when welding the support ring 20 to the front cover 40 as described later.

As shown in FIG. 3, the elastic body part 30 is attached to the support ring 20 and, in the present embodiment, is integrally formed with the support ring 20 so as to cover the inner periphery side of the support ring 20. For example, as shown in FIG. 3, the elastic body part 30 is attached to the inner circumferential surface 21b of the insert part 21 of the support ring 20 and the annular protruding part 23b of the outer side part 23 that protrudes toward the inner periphery side. The elastic body part 30 has the seal lip 31 as described above, and has an annular dust lip 32 that is provided further on the outer side (the side toward the arrow a direction) than the seal lip 31 and extends in the direction of the axis x. The elastic body part 30 further has an annular lip waist part 33. The seal lip 31 is formed so that the outer circumferential surface 14b of the boss part 14 of the damper pulley 10 in the sealing structure 1 comes into contact with the seal lip 31 such that the outer circumferential surface 14b is able to slide. The dust lip 32 is provided further on the outer side than the seal lip 31 and is formed so that the outer circumferential surface 14b of the boss part 14 of the damper pulley 10 comes into contact with the dust lip 32 such that the outer circumferential surface 14b is able to slide. The lip waist part 33 is a part of the elastic body part 30 that supports the seal lip 31 and the dust lip 32.

More specifically, as shown in FIG. 3, the seal lip 31 is a part that extends toward the inner side from the lip waist part 33 and an annular part centered or substantially centered about the axis x, and is formed to be opposed to the insert part 21 of the support ring 20. The seal lip 31 has, at an end portion thereof on the inner side, an annular wedge-like lip tip end portion 34 whose cross section protrudes toward the inner periphery side. The seal lip 31 further has, on the outer periphery side, an annular recessed part 35 at a position opposite to the lip tip end portion 34, and a garter spring 36 is fitted into the recessed part 35. The garter spring 36 presses the lip tip end portion 34 in the direction toward the axis x to exert a tightening force of a predetermined magnitude against the boss part 14 of the damper pulley 10 to the lip tip end portion 34 so that the lip tip end portion 34 follows a displacement of the boss part 14. The lip tip end portion 34 comes into contact with the outer circumferential surface 14b of the boss part 14 to seal between the sealing apparatus 2 and the boss part 14 as described later.

The dust lip 32 extends toward the outer side and toward the axis x from the lip waist part 33, and more specifically, extends in the direction toward the outer side and the inner periphery side from the lip waist part 33, as shown in FIG. 3. The dust lip 32 prevents entry of foreign matter, such as muddy water, sand, or dust, from the outer side toward the lip tip end portion 34. The dust lip 32 may be configured so that the dust lip 32 is not in contact with but is located close to the boss part 14 of the damper pulley 10.

The elastic body part 30 is integrally made of an elastic material, and the seal lip 31, the dust lip 32, the lip waist part 33 and the other parts are parts of the elastic body part 30 that are integrally made of an elastic material.

A resin material forming the support ring 20 is a weldable resin, such as a thermoplastic resin, as described later. However, the resin material forming the support ring 20 is a resin material that does not melt at the ambient temperature when the sealing structure 1 is in the usage state, that is, the ambient temperature when the engine is in the usage state. The resin material forming the support ring 20 is a hard thermoplastic synthetic resin material, such as polyamide, polyester, polypropylene, or ABS resin. The resin material forming the support ring 20 may be the same as the resin material forming the front cover 40. The elastic material forming the elastic body part 30 may be various rubber materials, for example. The various rubber materials include synthetic rubbers, such as nitrile rubber (NBR), hydrogenated nitrile rubber (H-NBR), acrylic rubber (ACM) or fluororubber (FKM). The support ring 20 is manufactured by injection molding, for example, and the elastic body part 30 is molded with a mold by cross-linking (vulcanization). In the cross-linking, the support ring 20 is placed inside the mold, the elastic body part 30 is bonded to the support ring 20 by cross-linking bonding, and then the elastic body part 30 is integrally molded with the support ring 20.

As described above, the support ring 20 of the sealing apparatus 2 has the insert part 21 and the outer side part 23, is elongated in the direction of the axis x and can cover the elastic body part 30 on the inner periphery side of the support ring 20. Therefore, the support ring 20 can protect the elastic body part 30 from the outside when a plurality of sealing apparatuses 2 are transported in a state where the sealing apparatuses 2 are stacked in the direction of the axis x or when the sealing apparatus 2 is assembled. In this respect, it is preferable that the elastic body part 30 be provided at a position where the elastic body part 30 is hidden by the support ring 20 when the sealing apparatus 2 is viewed from the outer periphery side in the radial direction.

As described above, the front cover 40 is made of a resin material, and the resin material may be a synthetic resin, such as polyamide, polyester, polypropylene or ABS resin. As shown in FIGS. 1 and 2, in the front cover 40, the through-hole 41, into which the crankshaft 51 and the boss part 14 of the damper pulley 10 are inserted, is formed. The annular gap g1 is formed between the inner circumferential surface 41a of the through-hole 41 and the outer circumferential surface 14b of the boss part 14, and the gap g1 is sealed by the sealing apparatus 2 welded to the front cover 40.

As shown in FIG. 2, the bonding part of the support ring 20 in the sealing structure 1 is bonded by welding to an outer side surface 42, which faces to the outer side of the front cover 40 at a location close to the through-hole 41. The front cover 40 further has a front cover protrusion part 43, which is an annular part that protrudes from the outer side surface 42 toward the disk part 16 of the hub 11 of the damper pulley 10. The front cover protrusion part 43 forms the labyrinth seal L1 described above in cooperation with the outer periphery side protrusion part 17a and the inner periphery side protrusion part 17b of the boss part 14 of the damper pulley 10. More specifically, as shown in FIG. 2, in the sealing structure 1, the front cover protrusion part 43 is located in the hub groove 11b, which is an annular groove formed by the outer periphery side protrusion part 17a and the inner periphery side protrusion part 17b. The front cover protrusion part 43 is not in contact with the hub groove 11b. Therefore, as shown in FIG. 2, an annular gap g2 having a U-shaped cross section is formed between the front cover protrusion part 43 and the hub groove 11b, so that the labyrinth seal L1 is formed between the front cover 40 and the damper pulley 10. From the viewpoint of improving the sealing performance of the labyrinth seal L1, it is preferable that the gap g2 between the front cover protrusion part 43 and the hub groove 11b is narrower.

Next, a method of bonding the support ring 20 of the sealing apparatus 2 to the front cover 40 will be described. First, a jig (not shown) is attached to the welding jig guide part 23a of the sealing apparatus 2 yet to be bonded shown in FIG. 3, the sealing apparatus 2 is held at the jig, and the insert part 21 of the support ring 20 is inserted into the through-hole 41 of the front cover 40 so that the projection part 22a of the bonding part 22 of the support ring 20 abuts against the outer side surface 42 of the front cover 40. Then, the projection part 22a of the bonding part 22 is made to vibrate while the projection part 22a is in pressure-contact with the outer side surface 42 of the front cover 40 to make the projection part 22a molten, thereby welding the support ring 20 to the outer side surface 42 of the front cover 40 at the molten projection part 22a of the bonding part 22. The means that makes the projection part 22a vibrate for welding may be the jig for holding the sealing apparatus 2 described above, other means that cause vibration, a means that applies ultrasonic wave or laser light, or other means.

As shown in FIGS. 3 and 4, the annular recessed part 22b is formed in the bonding part 22, and part of the molten projection part 22a that is not used for the welding of the support ring 20 to the front cover 40 flows into the recessed part 22b when the support ring 20 is welded to the front cover 40. Therefore, the state of bonding between the support ring 20 and the front cover 40 can be kept good, and formation of a welding burr can be inhibited or prevented. Although the recessed part 22b is located on the outer periphery side of the projection part 22a in the bonding part 22 in the example shown in the drawings, the recessed part 22b may be located on the inner periphery side of the projection part 22a, or a plurality of recessed parts 22b may be formed. Recessed parts 22b may also be provided on the outer periphery side and inner periphery side of the projection part 22a.

The welding jig guide part 23a to which a jig is to be attached is formed in the support ring 20 of the sealing apparatus 2, and the welding jig guide part 23a can improve the efficiency of the operation of attaching the sealing apparatus 2 to the front cover 40.

Next, an operation of the sealing structure 1 having the configuration described above will be described.

As described above, in the sealing apparatus 2, the support ring 20 made of resin is bonded by welding to the front cover 40 made of resin. The bonding forms a seal between the sealing apparatus 2 and the front cover 40. Therefore, the difference in coefficient of thermal expansion between the sealed parts of the support ring 20 and front cover 40 can be reduced, the state of bonding between the support ring 20 and the front cover 40 can be stabilized, and the state of sealing between the sealing apparatus 2 and the front cover 40 can be stably maintained. In this way, in the sealing structure 1, no gap is formed between the support ring 20 and the front cover 40, and a reduction of the sealing performance in response to the usage state can be prevented. Therefore, it is preferable that the difference in coefficient of thermal expansion between the resin material forming the support ring 20 and the resin material forming the front cover 40 be small.

The relative positions of the support ring 20 and the boss part 14 of the damper pulley 10 can vary because of the difference in coefficient of thermal expansion, and therefore, depending on the state of the ambient temperature, the dust lip 32 may come off the outer circumferential surface 14b of the boss part 14 or the distance between the dust lip 32 and the outer circumferential surface 14b of the boss part 14 may increase, and foreign matter may become more likely to enter into the side of the seal lip 31. However, the sealing structure 1 has the labyrinth seal L1 on the upstream side of the dust lip 32 along the path of entry of foreign matter, and entry of foreign matter is blocked by the labyrinth seal L1. Therefore, as described above, even if the dust lip 32 becomes more likely to permit entry of foreign matter into the side of the seal lip 31 because of thermal expansion, the labyrinth seal L1 can prevent entry of foreign matter and compensate for the decline of the performance of the dust lip 32. The labyrinth seal L1 can further prevent entry of foreign matter.

In this way, the sealing structure 1 for a front cover 40 of an engine according to the embodiment of the present disclosure can maintain the sealing performance regardless of the usage state thereof.

Although an embodiment of the present disclosure has been described above, the present disclosure is not limited to the embodiment of the present disclosure described above but includes any aspects to be included in the concept and claims of the present disclosure. Furthermore, the components described above may be selectively combined as required in order to solve at least some of the problems described above or to achieve at least some of the effects described above. For example, the shape, material, position, size, manufacturing method or the like of each component in the embodiment described above can be modified as required depending on the specific implementation of the present disclosure.

For example, the configuration of the labyrinth seal positioned upstream of the dust lip 32 along the path of entry of foreign matter in the present disclosure is not limited to the labyrinth seal L1 described above but may be other configurations. For example, although the labyrinth seal L1 is formed by the front cover protrusion part 43 being positioned in the hub groove 11b formed by the outer periphery side protrusion part 17a and the inner periphery side protrusion part 17b, a labyrinth seal may be formed by a gap formed by one protrusion and another protrusion opposed to each other. More specifically, the damper pulley 10 may have only one of the outer periphery side protrusion part 17a and the inner periphery side protrusion part 17b, and the labyrinth seal L1 may be formed by the one of the outer periphery side protrusion part 17a and the inner periphery side protrusion part 17b and the front cover protrusion part 43.

Figure 5:
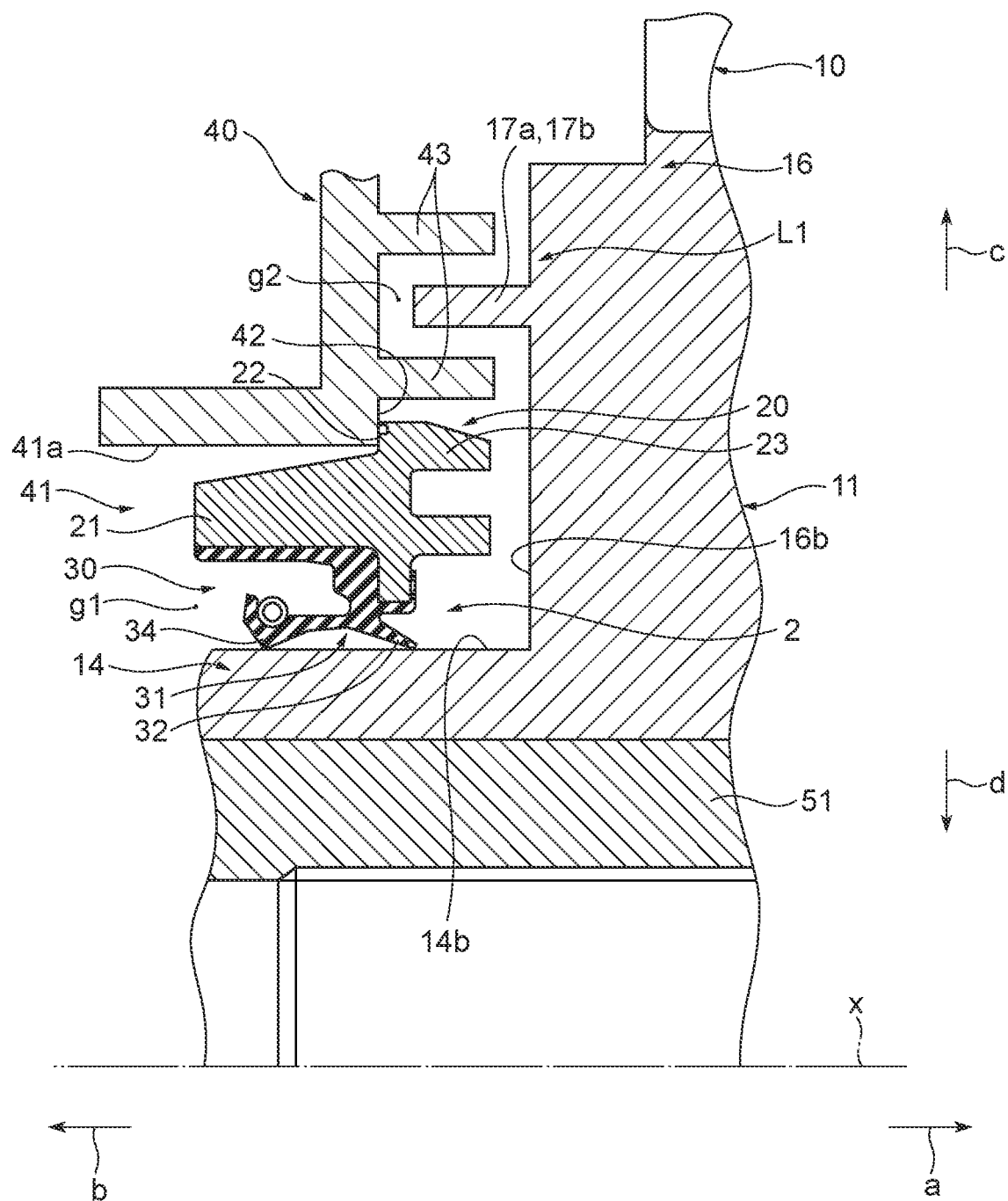
FIG. 5 is a cross-sectional view showing a modification of a labyrinth seal in the sealing structure for a front cover of an engine according to the embodiment of the present disclosure.

Alternatively, as shown in FIG. 5, the front cover 40 may have two front cover protrusion parts 43, which form an annular groove as with the outer periphery side protrusion part 17a and the inner periphery side protrusion part 17b, and the outer periphery side protrusion part 17a or inner periphery side protrusion part 17b may be positioned in the groove to form a labyrinth seal L1. In this case, the damper pulley 10 may have only one of the outer periphery side protrusion part 17a and the inner periphery side protrusion part 17b. Alternatively, the front cover 40 may have a plurality of front cover protrusion parts 43, the damper pulley 10 may have a plurality of torsional damper protrusion parts (outer periphery side protrusion part 17a or inner periphery side protrusion part 17b), and gaps between the plurality of protrusion parts may form a labyrinth seal L1.

Figure 6:
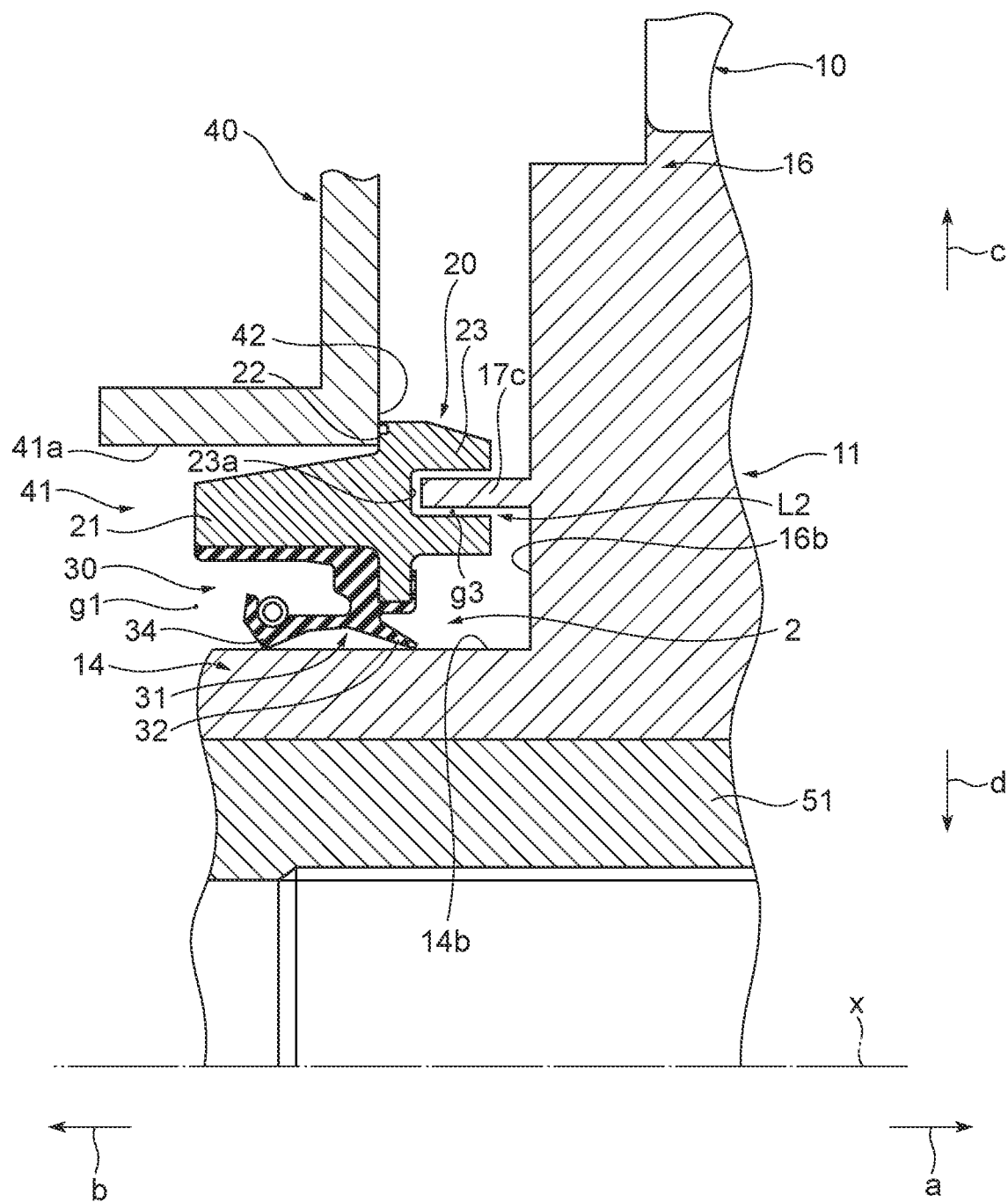
FIG. 6 is a cross-sectional view showing another modification of a labyrinth seal in the sealing structure for a front cover of an engine according to the embodiment of the present disclosure.

Instead of or in addition to the labyrinth seal L1 described above, the support ring 20 may form a labyrinth seal in cooperation with the damper pulley 10. For example, as shown in FIG. 6, a labyrinth seal L2 may be provided between the support ring 20 and the damper pulley 10. For example, an annular protrusion part 17c that is to be positioned in the welding jig guide part 23a of the outer side part 23 of the support ring 20 may be formed on the inner side surface 16b of the disk part 16 of the damper pulley 10, and an annular gap g3 having an U-shaped cross section may be formed between the protrusion part 17c and the welding jig guide part 23a to form a labyrinth seal L2 between the support ring 20 and the damper pulley 10. The labyrinth seal L2 between the support ring 20 and the damper pulley 10 may have another configuration. For example, the labyrinth seal L2 may be formed by the protrusion part 17c forming an annular gap, being opposed to the outer circumferential surface or inner circumferential surface of the outer side part 23 of the support ring 20 on the outer periphery side or inner periphery side, respectively. Alternatively, the damper pulley 10 may have a hub groove 11b instead of the protrusion part 17c, and the support ring 20 may have an annular protrusion part that is to be positioned in the hub groove 11b to form the labyrinth seal L2.

Although the support ring 20 is bonded by welding to the front cover 40 in the sealing structure 1 described above, the support ring 20 may be bonded to the front cover 40 with an adhesive. In this case, the support ring 20 does not have to have the projection part 22a and the recessed part 22b in the bonding part 22 and has only the bonding surface 22c. The bonding part 22 may have the recessed part 22b as a space to accommodate the adhesive.

Figure 7:
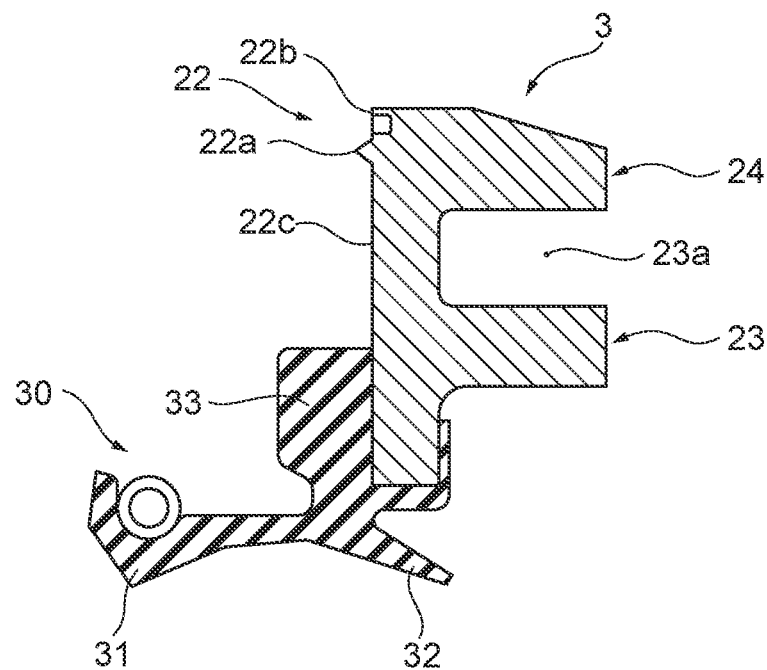
FIG. 7 is a cross-sectional view showing a modification of the sealing apparatus in the sealing structure for a front cover of an engine according to the embodiment of the present disclosure.
Figure 8:
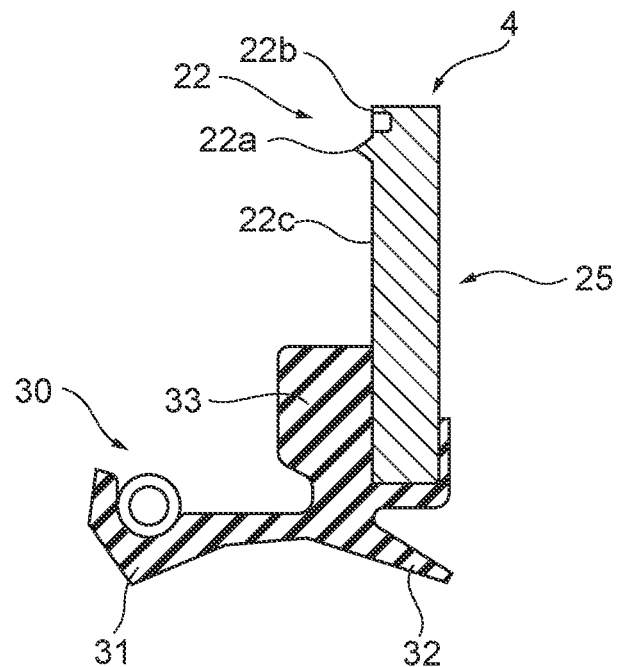
FIG. 8 is a cross-sectional view showing another modification of the sealing apparatus in the sealing structure for a front cover of an engine according to the embodiment of the present disclosure.

The support ring in the sealing apparatus according to the present disclosure is not limited to the support ring 20 described above but may have other configurations as far as the elastic body part 30 can be attached and the support ring 20 can be bonded to the front cover 40. For example, the modifications of the sealing apparatus shown in FIGS. 7 and 8 are also possible. As shown in FIG. 7, a sealing apparatus 3 according to a first modification has a support ring 24, which is different from the support ring 20 of the sealing apparatus 2, and the support ring 24 does not have the insert part 21. As shown in FIG. 8, a sealing apparatus 4 according to a second modification has a support ring 25, which is different from the support ring 20 of the sealing apparatus 2, and the support ring 25 does not have the insert part 21 and the outer side part 23.

Figure 9:
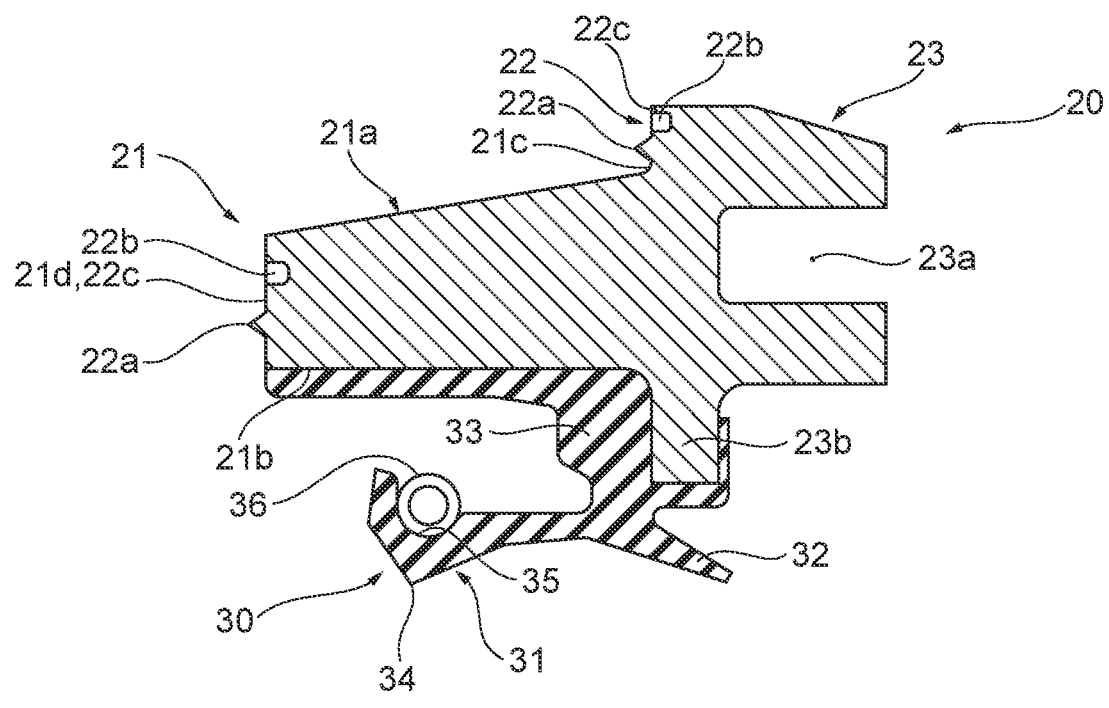
FIG. 9 is a cross-sectional view showing a modification of the bonding part of the support ring in the sealing structure for a front cover of an engine according to the embodiment of the present disclosure.

A part of the support ring 20 to be welded to the front cover 40 is not limited to the part (the bonding part 22) described above. For example, the bonding part 22 may be located at another position on the support ring 20, or the support ring 20 may have a plurality of bonding parts 22. For example, as shown in FIG. 9, the support ring 20 may have another bonding part 22 on an inner side surface 21d of the insert part 21. In this case, a part to which the bonding part 22 of the insert part 21 is to be welded is provided on the front cover 40.

Although a case in which the present disclosure is applied to a sealing structure for a front cover of an engine has been illustrated in the embodiment described above, the cover made of resin according to the present disclosure is not limited to the front cover of an engine but may be another cover made of resin. The present disclosure can be applied to a sealing structure between a shaft part that makes a motion, such as a rotational motion or a reciprocating motion, and a cover made of resin, and the cover made of resin according to the present disclosure may be a cover made of resin of a transmission of an automobile or the like, a cover made of resin of a differential mechanism of an automobile or the like, a cover made of resin of a steering mechanism, a cover made of resin of a motor, or a cover made of resin of a speed reducer, for example. The present disclosure can be applied to a shaft part that makes a motion, such as a rotational motion or a reciprocating motion, and a cover made of resin that has a space in which the shaft part is to be inserted, in order to seal the gap between the shaft part and the cover made of resin.

The invention claimed is:

1. A sealing structure for a cover made of resin, the sealing structure comprising:
    the cover made of resin, which has a through-hole into which a shaft part is to be inserted; and
    a sealing apparatus to seal between the through-hole of the cover and the shaft part,
    wherein the sealing apparatus includes a support ring that is made of resin and has an annular shape about an axis, and an elastic body part that is made of an elastic material, has an annular shape about the axis, and is attached to the support ring,
    in a direction of the axis, an inner side is a direction toward an inside of the cover and an outer side is a direction away from the inside of the cover,
    the elastic body part has an annular seal lip that contacts the shaft part such that the shaft part is able to slide, and
    the support ring has an insert part which is an annular part that is to be inserted into the through hole, an outer side part which is an annular part that protrudes to the outer side from the through-hole and toward the outer side beyond the insert part, and a bonding part which is formed at the outer side part and has a surface that is annular about the axis and faces to the inner side,
    wherein the insert part extends along the axis and has an outer circumferential surface facing an outer periphery side,
    wherein the outer circumferential surface is spaced apart from an inner circumferential surface of the cover and terminates at an end portion having a diameter that is equal to a diameter of the inner circumferential surface of the cover, and
    wherein the boding part is bonded by welding to the cover.

2. The sealing structure for a cover made of resin according to claim 1, the outer circumferential surface of the insert part being a tapered surface having a diameter that decreases from the outer side toward the inner side in the direction of the axis.

3. The sealing structure for a cover made of resin according to claim 1, the outer side part having a welding jig guide part which is an annular recessed part that is recessed from the outer side toward the inner side.

4. The sealing structure for a cover made of resin according to claim 1, a damper pulley as a torsional damper being positioned on the outside of the sealing apparatus, and a labyrinth seal being provided between the support ring and the damper pulley.

5. The sealing structure for a cover made of resin according to claim 4, the damper pulley having an annular protrusion that is to be positioned in the welding jig guide part,
   wherein the labyrinth seal is formed between the protrusion part and the welding jig guide part.

6. The sealing apparatus according to claim 1,
   the support ring being an annular member made of resin, and
   the elastic body part being made of an elastic material attached to the support ring,
   wherein the elastic body part is integrally formed with the support ring so as to cover an inner periphery side of the support ring and has the seal lip, and
   wherein the support ring has a welding jig guide part formed on an annular side surface orthogonal to the axis, the welding jig guide part being an annular recessed part that is recessed along the axis.

7. The sealing apparatus according to claim 6, the support ring having a bonding surface which is annular about the axis and faces the inner side in the direction of the axis x and an annular projection part that protrudes toward the inner side from the bonding surface in the direction of the axis.

8. The sealing apparatus according to claim 7, the support ring having an annular recessed part recessed from the bonding surface in the direction of the axis that is formed at least in any of an inner periphery side or an outer periphery side of the projection part.

* * * * *